US012265971B1

(12) United States Patent
Wang et al.

(10) Patent No.: US 12,265,971 B1
(45) Date of Patent: Apr. 1, 2025

(54) SYSTEM, METHOD, AND COMPUTER PROGRAM FOR ADJUSTING OPERATIONS OF A CUSTOMER SERVICE APPLICATION BASED ON METRICS GENERATED FROM SUBSTANTIALLY REAL-TIME MONITORING OF ENTITY STATES

(71) Applicant: ASAPP, Inc., New York, NY (US)

(72) Inventors: Shang-wei Wang, Queens, NY (US); Wyndham Bolling Blanton, El Rito, NM (US)

(73) Assignee: ASAPP, Inc., New York, NY (US)

( * ) Notice: Subject to any disclaimer, the term of this patent is extended or adjusted under 35 U.S.C. 154(b) by 157 days.

(21) Appl. No.: 17/138,455

(22) Filed: Dec. 30, 2020

(51) Int. Cl.
  *G06Q 30/016* (2023.01)
(52) U.S. Cl.
  CPC .................. *G06Q 30/016* (2013.01)
(58) Field of Classification Search
  CPC .... G06Q 30/01; G06Q 30/012; G06Q 30/014; G06Q 30/016; G06Q 30/018; G06Q 30/0185
  USPC ....................................................... 705/304
  See application file for complete search history.

(56) References Cited

U.S. PATENT DOCUMENTS

| | | | | |
|---|---|---|---|---|
| 10,554,817 B1* | 2/2020 | Sullivan | ............... | H04L 41/5054 |
| 11,106,442 B1* | 8/2021 | Hsiao | ...................... | H04L 41/22 |
| 2012/0331553 A1* | 12/2012 | Aziz | ...................... | H04L 63/145 |
| | | | | 726/23 |
| 2013/0191185 A1* | 7/2013 | Galvin | ................... | G06Q 10/10 |
| | | | | 705/7.36 |
| 2014/0245443 A1* | 8/2014 | Chakraborty | ....... | H04L 63/1425 |
| | | | | 726/23 |
| 2016/0088153 A1* | 3/2016 | Wicaksono | ........... | H04M 3/523 |
| | | | | 379/265.06 |
| 2022/0198229 A1* | 6/2022 | Oñate López | ........ | H04L 43/067 |

OTHER PUBLICATIONS

Lan Linton, "How to Make a Customer Service Process Flowchart", Sep. 26, 2017, https://bizfluent.com/how-2155533-make-customer-service-process-flow.html (Year: 2017).*

(Continued)

*Primary Examiner* — Sangeeta Bahl
*Assistant Examiner* — Joshua D Schneider
(74) *Attorney, Agent, or Firm* — Lessani Law Group, PC

(57) ABSTRACT

The present disclosure relates to a system, method, and computer program for adjusting operations of a customer service application based on metrics generated as a result of substantially real-time monitoring of entity states within the customer service application. The system receives entity events from a plurality of services associated with the customer service application. It tracks states of entities in substantially real time within the customer service application based on the events and the state machine logic for the customer service application, including identifying any entities in an anomalous state. For each non-anomalous state transition, one or more state transition measurements are calculated. The system generates metrics for the customer service application based on the state transition measurements for entities in a non-anomalous state and adjusts the operations of the customer service application in substantially real time based on the metrics.

15 Claims, 4 Drawing Sheets

(56) References Cited

OTHER PUBLICATIONS

Andrew Hooker, "Improving the State Machine of Your Business", Nov. 15, 2018, https://www.headway.io/blog/improving-the-state-machine-of-your-business (Year: 2018).*

Harvard Business Review Analytic Services, "Real Time Analytics", Harvard Business Review, Jun. 4, 2018, retrieved from https://hbr.org/sponsored/2018/06/real-time-analytics (Year: 2018).*

Qiuping Yu, "When Providing Wait Times, It Pays to Underpromise and Overdeliver", Harvard Business Review, Oct. 21, 2020, retrieved from https://hbr.org/2020/10/when-providing-wait-times-it-pays-to-underpromise-and-overdeliver (Year: 2020).*

Tableau, "Customer Experience, Service, and Support Dashboards", Oct. 24, 2020, retrieved from https://web.archive.org/web/20201024144057/https://www.tableau.com/solutions/support-and-service-analytics/dashboards (Year: 2020).*

\* cited by examiner

SYSTEM, METHOD, AND COMPUTER PROGRAM FOR ADJUSTING OPERATIONS OF A CUSTOMER SERVICE APPLICATION BASED ON METRICS GENERATED FROM SUBSTANTIALLY REAL-TIME MONITORING OF ENTITY STATES

BACKGROUND OF THE INVENTION

1. Field of the Invention

This invention relates generally to customer service applications and, more specifically, to a system and method for adjusting operations of a customer service application based on metrics generated as a result of substantially real-time monitoring of entity states.

2. Description of the Background Art

Customer service applications are used to collect, organize, respond to, and report on customer support requests. The majority of businesses utilize such applications, but not necessarily effectively or efficiently. Effectiveness relates to identifying what needs to be done and efficiency relates to accomplishing something with the minimum expenditure of time and effort. In order to improve the effectiveness and efficiency of customer service applications, there is a need to analyze the metrics of customer service applications. Examples of metrics include the average time a customer is queued before being assigned to an agent, the average time it takes an agent to respond to a customer after the agent is assigned an issue, the average time it takes to resolve the customer issue, etc.

Known systems for measuring such metrics perform their analysis in batch processes after the relevant events have occurred and process all available data including data that has been corrupted and can skew the resulting analysis. For example, inclusion of corrupt data may skew the response time of agents from minutes to days. Known systems that have tried to measure metrics in real time have been very slow and resource intensive because they reconstruct the entity states and recompute the transition functions ($\delta$) between states each time an input or request is made.

Therefore, there is a demand for a system that can track and analyze the data in substantially real time in order to provide the feedback necessary to adjust the operations of the customer service applications in substantially real time. There is also a demand for a system that would identify and separate corrupt data so that the analysis of the remaining data would be meaningful. Such a system has the benefit of increasing the effectiveness and efficiency in the operations of customer service applications.

SUMMARY OF THE DISCLOSURE

The present disclosure describes a system, method, and computer program for adjusting operations of a customer service application based on metrics generated as a result of substantially real-time monitoring of entity states within the customer service application. The method is performed by a computer system that tracks and monitors customer service applications.

The system receives entity events from one or more services in substantially real time. Examples of entities include customer issues, agents, customers, queues, etc. For each event, the system identifies a pre-event state associated with the entity to which the event pertains. If an entity is new, the system initializes the entity with a starting state based on the state machine logic for the customer service application. The system determines whether the event is a valid event for the entity given the pre-event state and the state machine logic for the customer service application. If the event is not a valid event, the system records an anomalous state for the entity. If the event is a valid event, the system determines whether the event represents a state transition for the entity. If the event represents a state transition, the system records the new state and calculates one or more state transition measurements. The system then calculates metrics for the customer service application based at least in part on state transition measurements for a plurality of entities in the customer service application while excluding entities with anomalous states. The system then adjusts the operations of the customer service application in substantially real time based on the metrics.

In one embodiment, a method for adjusting operations of a customer service application based on metrics generated as a result of substantially real-time monitoring of entity states within the customer service application comprises the following steps:

- receiving entity events from a plurality of services associated with the customer service application;
- tracking states of entities within the customer service application based on the events and the state machine logic for the customer service application, including identifying any entities in an anomalous state, wherein the states are state-machine states that are tracked in substantially real time and wherein tracking states of entities includes, for each state entered by an entity, tracking a time in which the entity enters a state;
- for each non-anomalous state transition, calculating one or more state transition measurements, including a time measurement associated with a transition to a state;
- generating metrics for the customer service application based on the state transition measurements for entities in a non-anomalous state; and
- adjusting the operations of the customer service application in substantially real time based on the metrics.

DETAILED DESCRIPTION OF THE PREFERRED EMBODIMENTS

The present disclosure describes a system, method, and computer program for adjusting operations of a customer service application based on metrics generated as a result of substantially real-time monitoring of entity states within the customer service application. The method is performed by a computer system that tracks and monitors the customer service applications ("the system").

The system receives entity events from one or more services in substantially real time. Examples of entities include customer issues, agents, customers, queues, etc. For each event, the system identifies a pre-event state associated with the entity to which the event pertains. If an entity is new, the system initializes the entity with a starting state based on the state machine logic for the customer service application. The system determines whether the event is a valid event for the entity given the pre-event state and the state machine logic for the customer service application. If the event is not a valid event, the system records an anomalous state for the entity. If the event is a valid event, the system determines whether the event represents a state transition for the entity. If the event represents a state transition, the system records the new state and calculates one or more state transition measurements. The system then calculates metrics for the customer service application based at least in part on state transition measurements for a plurality of entities in the customer service application while excluding entities with anomalous states. The system then adjusts the operations of the customer service application in substantially real time based on the metrics.

Example implementations of the method are described in more detail with respect to FIGS. 1-4.

Figure 1:
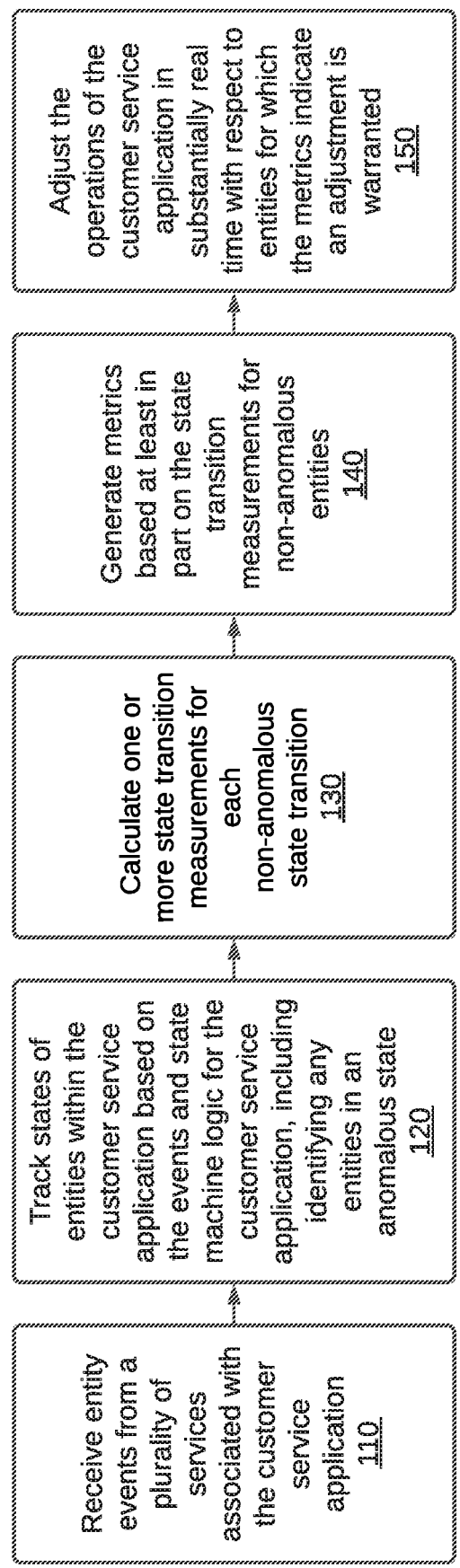
FIG. 1 is a flowchart that illustrate a method, according to one embodiment, for adjusting operations of a customer service application based on metrics generated as a result of substantially real-time monitoring of entity states within the customer service application.

FIG. 1 illustrates a method for adjusting operations of a customer service application based on metrics generated as a result of substantially real-time monitoring of entity states within the customer service application. The steps of FIG. 1 often take place in parallel as new entity events are received from a plurality of services. The system receives entity events from a plurality of services associated with the customer service application (step 110).

The system tracks states of the entities within the customer service application based on the events and state machine logic for the customer service application (step 120). The states are state machine states that are tracked in substantially real time. Tracking states of entities include, for each state entered by an entity, tracking a time in which the entity enters a state. Tracking entity states includes identifying any entities that are in an anomalous state. If an event is not a valid option based on the state of the entity and the state machine logic, then the system determines that the entity is in an anomalous state.

For each non-anomalous state transition, the system calculates one or more state transition measurements (step 130). In certain embodiments, this includes a time measurement associated with a transition to a state. For example, the system may calculate the amount of time it took an entity to exit a state.

In addition to state transition measurements, the system may calculate measurements related to an entity staying in a current state. For example, it may calculate how long an entity has been in a state.

The system generates metrics for the customer service application based at least in part on the state transition measurements for entities in a non-anomalous state (step 140). Finally, the system adjusts the operations of the customer service application in substantially real time based on the metrics. The system may adjust the operations with respect to those entities for which the metrics indicate an adjustment is warranted (step 150).

For example, in certain embodiments, the system may adjust the operations of the customer service application in the following ways. Based on queue wait times and/or queue depth issues, an issue may automatically be transferred to other queues. Based on the handle times of various agents around specific intent classifications (i.e., task types) and agent expertise, the system may route issues to certain agents for fastest resolution. Based on previous history of issue volumes and agent availability, dynamic messages can be sent to customers about how long they have to wait for an agent. Based on the agents' dynamic availability, the system may automatically transfer issues to other agents. Based on customers' availability, as determined by the last message time, last computer ping check, etc., the system may automatically pause, remove, or resume issues from a given agent's queue. Based on current issue trends (e.g., the number of issues with a specific intent classification), the system may dynamically present messages to the customer about known issues and potential resolutions to shorten wait times. Based on current issue trends (e.g., general volume, specific intent classifications, etc.), the system may alert or present to managers information about staffing requirements. Based on agents' past feedback ratings and general handle times, the system may present to managers in real time the need for intervention for a given issue. Based on general sentiment of a conversation, the system may present to both agent and managers techniques for resolution/escalation. Based on detected anomalous events for a given issue (e.g., failed API requests, failed authentication, etc.), the system may indicate to the agent a specific trouble a customer may be having and/or alert managers of potential outages of their internal systems and suggested remediations. Based on detected anomalous events, the system may escalate the issue to managers or a different queue for better issue resolution. Based on the customers' interactions, the system may proactively attempt to block general infiltration attacks (e.g., DDoS attacks, spoofing attacks, etc.). Based on a customer's general known information in real time, the system may present them with proactive messages around issues, sales, or other items that have been useful for previous customers as measured by issue resolution and feedback.

In certain embodiments, entities may include customer issues, agents, customers, queues, etc. In certain embodiments where entities are issues, metrics are generated that may include one or more of the following: average handle time for an issue, average waiting time before an issue is assigned to an agent, average time for an agent to respond after an issue is assigned to the agent, etc., where the metrics are calculated over one or more time periods. In certain embodiments where the entities are agents, metrics are generated that may include one or more of the following: average number of issues handled concurrently, average response time, percentage of issues for which agents use automated response tools, average non-active time while logged in, etc. In certain embodiments where the entities are queues, metrics are generated that may include one or more of the following: how many issues are pending, how long are issues in the queue, etc. In certain embodiments, the system tracks both issues resolved and issues ended and provides metrics for issue resolution rate/count and issue satisfaction. In certain embodiments, metrics are calculated on a per-entity basis and on an aggregate basis, where anomalous per entity metrics are filtered out before calculating metrics on an aggregate basis.

In certain embodiments, in addition to tracking state-machine states of entities, the system tracks one or more counts associated with the entity, and one or more metrics are generated based on the counts associated with the entities. In certain embodiments, the one or more counts are one or more of the following: a number of messages transmitted by a customer, a number of messages transmitted by an agent, a number of times an issue has been transferred to a new agent, a number of agents that have handled an issue, a number of customer service application flows the issue has been through, etc. In certain embodiments, the state transition measurements include a count measurement associated with a transition to a state. For example, if an agent generated three text messages in state A before transitioning to state B, a count-based state transition measurement for the transition from state A to state B may be "three agent text messages."

In certain embodiments, the method further comprises displaying information related to the metrics in a user dashboard, including displaying information related to entities in an anomalous state in the user dashboard. In certain embodiments, the system will alert the customer service application of entities in an anomalous state.

Figure 2:
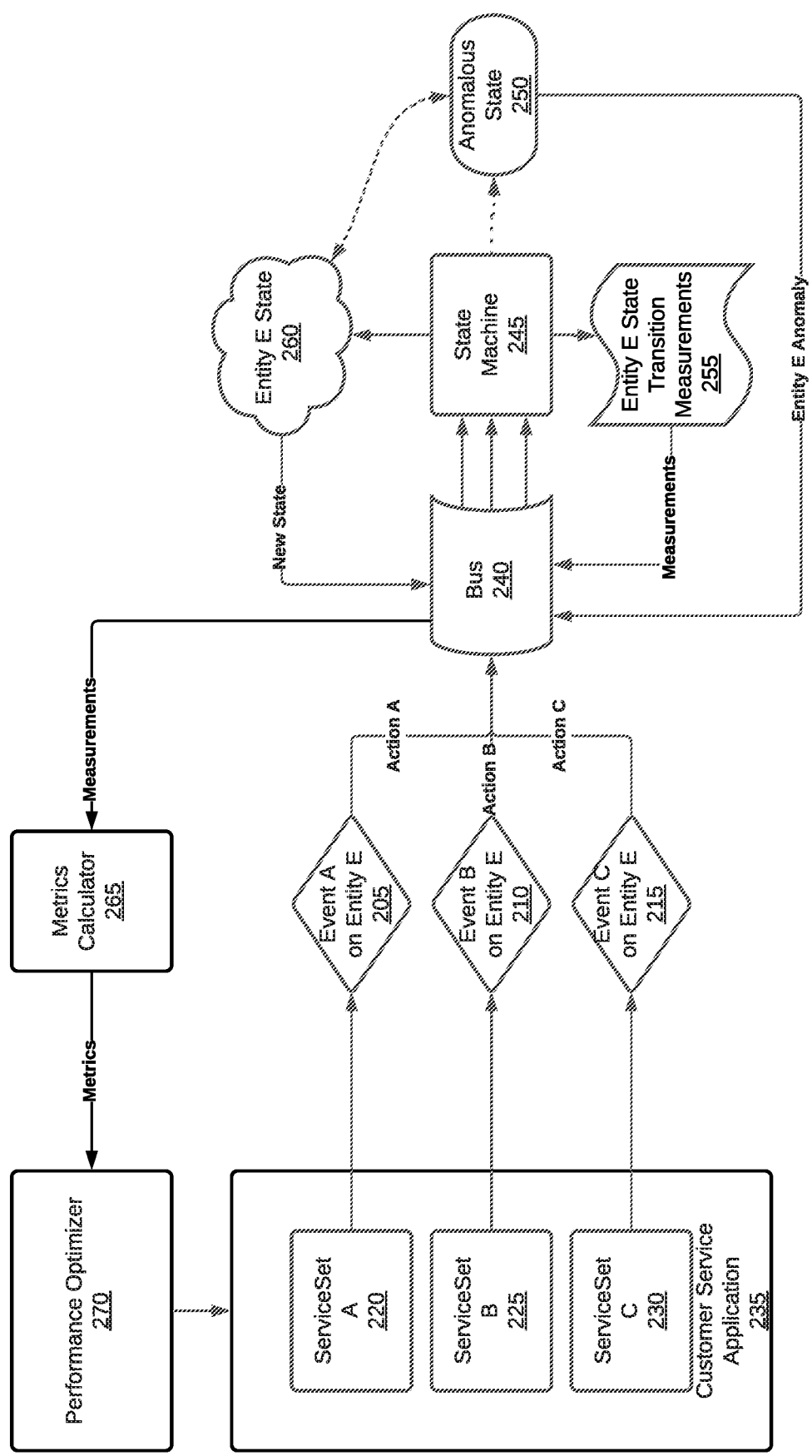
FIG. 2 is a block diagram that illustrates an example software architecture, according to one embodiment, for performing the method of FIG. 1.

FIG. 2 illustrates an example architecture for a system that performs the methods described herein. However, the methods described herein may be implemented in other systems and are not limited to the system as illustrated. With reference to FIG. 1, entity events A, B, and C for entity E 205, 210, 215 are received from service sets A, B, and C 220, 225, 230 of the customer service application 235. These entity events 205, 210, 215 are sent as actions A, B, and C to a bus 240, which transports the data to a state machine 245. The state machine 245 tracks the states of the entities within the customer service application 235. If the state machine 245 identifies entity E as being in an anomalous state 250, this information is sent back to the bus 240. If the state machine 245 determines that entity E is non-anomalous and has transitioned to a new state, it calculates a state transition measurement 255, updates the state of entity E 260, and sends the measurements and new state back to the bus 240. As stated above, the system may also calculate measurements related to how long an entity has remained in a state, as well as counts associated with the entity, and these measurements are also outputted to the bus 240. The bus 240 then transports any measurements to the metrics calculator 265, which sends the metrics to the performance optimizer 270. The performance optimizer 270 adjusts the operations of the customer service application 235 in substantially real time with respect to entities for which the metrics indicated an adjustment is indicated.

Figure 3:
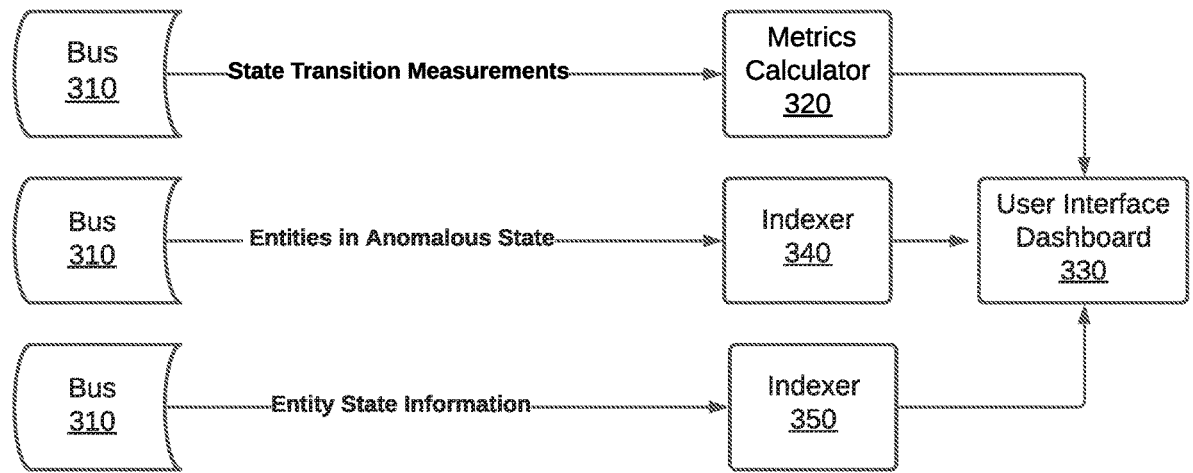
FIG. 3 is a block diagram that illustrates an example software architecture, according to one embodiment, related to dashboarding and user interfaces.

FIG. 3 illustrates an example architecture for the system with respect to dashboarding and user interfaces. A bus 310 transports state transition measurements to a metrics calculator 320 (which may be the same as metrics calculator 265 in FIG. 2), which displays calculated metrics in a user interface dashboard 330. The bus 310 also transports information related to entities in an anomalous state to an indexer 340, which creates an index of entities in an anomalous state, and displays information related to entities in an anomalous state in the user interface dashboard 330. The bus 310 also transports entity state information to another indexer 350, which indexes the state information, and displays state-related information (e.g., the number of entities currently in each state) in the user interface dashboard 330.

Figure 4:
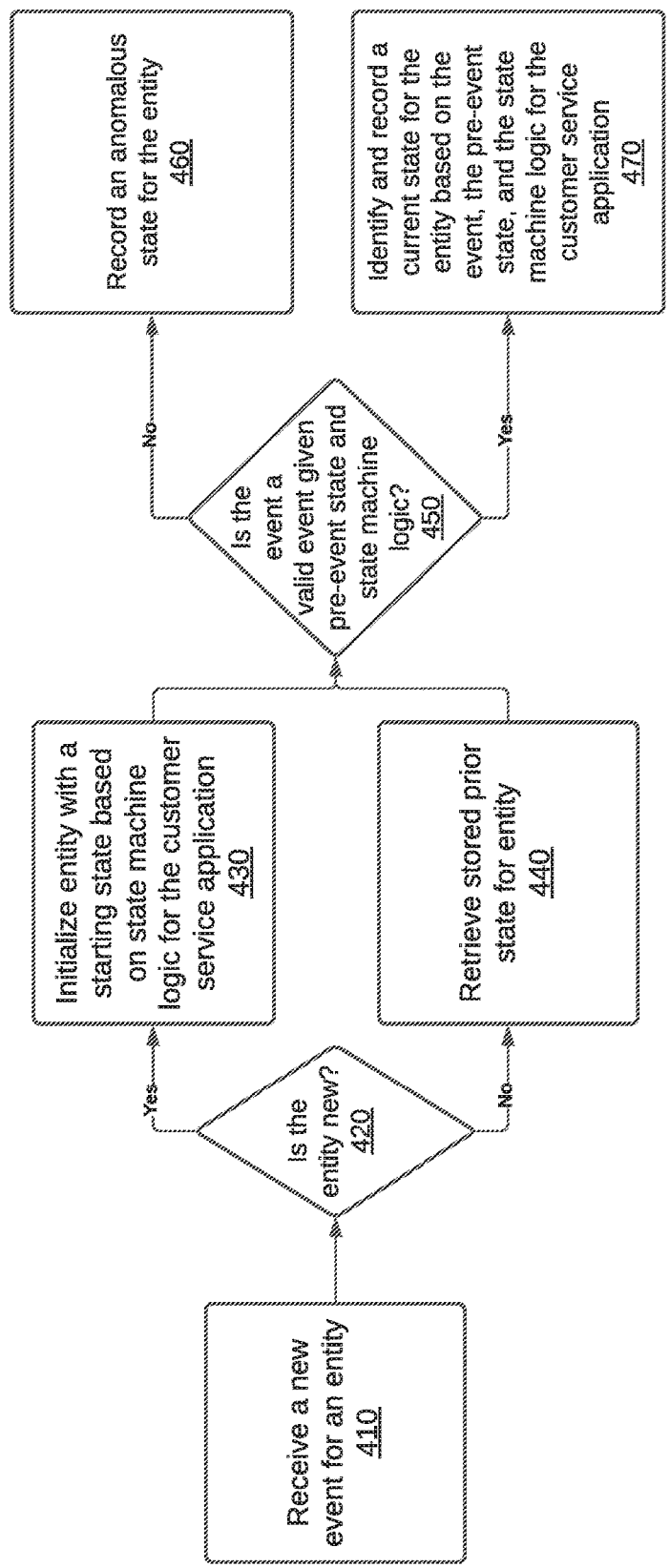
FIG. 4 is a flowchart that illustrates a method, according to one embodiment, for tracking the states of the entities.

FIG. 4 illustrates a method for tracking the states of the entities. The system receives a new event for an entity (step 410). The system determines if the entity is new (step 420). If the entity is new, the entity is initialized with a starting state based on state machine logic for the customer service application (step 430). If, however, the entity is not new, a stored prior state for the entity is retrieved (step 440). The system then determines if the event is a valid event given the pre-event state (or starting state) and state machine logic for the customer service application (step 450). A valid event is an event that is allowed for the entity given its pre-event state and the state machine logic. If the event is not a valid event, an anomalous state is recorded for the entity (step 460). If, however, the event is a valid event, the system identifies and records a current state for the entity based on the event, the pre-event state, and the state machine logic for the customer service application (step 470).

The methods described with respect to FIGS. 1-4 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for adjusting operations of a customer service application based on metrics generated as a result of real-time monitoring of entity states within the customer service application, the method comprising:

receiving at a bus entity events from a plurality of services provided by the customer service application;

tracking states of entities in real time in a state machine for the customer service application based on the events received from the bus and the state machine logic for the customer service application, wherein tracking states of entities includes 1) identifying any entities in an anomalous state and 2) for each state entered by an entity, tracking a time in which the entity enters a state;

sending information on any entities identified by the state machine as being in an anomalous state back to the bus, wherein the bus transports the information to an indexer, and wherein the indexer creates an index of entities in an anomalous state;

for each non-anomalous state transition, calculating one or more state transition measurements, including how long an entity has been in a state;

generating per-entity metrics and aggregate metrics, wherein the per-entity metrics and aggregate metrics include network metrics, at a metrics calculator for the customer service application based at least in part on the state transition measurements for entities in a non-anomalous state, wherein anomalous per-entity metrics are filtered out before calculating the aggregate metrics;

adjusting in a performance optimizer the operations of the customer service application in real time based on the per-entity metrics and the aggregate metrics, wherein adjusting the operations of the customer service application in real time based on the per-entity metrics and the aggregate metrics comprises:

determining based on the per-entity metrics and the aggregate metrics generated from customers' interactions with the customer service application that an external entity is attempting to infiltrate the computer system, and in response to determining based on the per-entity metrics and the aggregate metrics that the external entity is attempting to infiltrate the computer system, the performance optimizer automatically and proactively blocking the infiltration attempt by the external entity against the computer system; and displaying information related to the per-entity metrics and the aggregate metrics and the index of entities in an anomalous state in a user interface dashboard.

2. The method of claim 1, wherein, in addition to tracking state-machine states of entities, the system tracks one or more counts associated with the entity, and wherein one or more per-entity and/or aggregate metrics are generated based on the counts associated with entities.

3. The method of claim 2, wherein the one or more counts are one or more of the following: a number of messages transmitted by a customer, a number of messages transmitted by an agent, a number of times an issue has been transferred to a new agent, a number of agents that have handled an issue, and a number of customer service application flows the issue has been through.

4. The method of claim 2, wherein the state transition measurements include a count measurement associated with a transition to a state.

5. The method of claim 1, further comprising alerting the customer service application of entities in an anomalous state.

6. The method of claim 1, wherein tracking states of the entities comprises:
for each event received, performing the following in real time:
identifying a pre-event state associated with an entity to which the event pertains, wherein, in response to the entity being new, the pre-event state is a starting state based on state machine logic for the customer service application;
determining whether the event is a valid event for the entity given the pre-event state and the state machine logic for the customer service application;
in response to determining not a valid event for the entity, recording an anomalous state for the entity; and
in response to determining a valid event, identifying a current state for the entity based on the event, the pre-event state, and the state machine logic for the customer service application.

7. The method of claim 1, wherein the entities are one or more of the following: customer issues, agents, customers and queues.

8. The method of claim 1, wherein the entities are issues and the per-entity and/or aggregate metrics generated include one or more of the following: average handle time for an issue, average waiting time before an issue is assigned to an agent, average time for an agent to respond after an issue is assigned to the agent, wherein the per-entity and/or aggregate metrics are calculated over one or more time periods.

9. The method of claim 1, wherein the entities are agents, and the per-entity and/or aggregate metrics generated include one or more of the following: average number of issues handled concurrently, average response time, percentage of issues for which agents use automated response tools, and average non-active time while logged in.

10. A non-transitory computer-readable medium comprising a computer program, that, when executed by a computer system, enables the computer system to perform the following method for adjusting operations of a customer service application based on metrics generated as a result of real-time monitoring of entity states within the customer service application, the steps comprising:

receiving at a bus entity events from a plurality of services provided by the customer service application;
tracking states of entities in real time in a state machine for the customer service application based on the events received from the bus and the state machine logic for the customer service application, wherein tracking states of entities includes 1) identifying any entities in an anomalous state and 2) for each state entered by an entity, tracking a time in which the entity enters a state;
sending information on any entities identified by the state machine as being in an anomalous state back to the bus, wherein the bus transports the information to an indexer, and wherein the indexer creates an index of entities in an anomalous state;
for each non-anomalous state transition, calculating one or more state transition measurements, including how long an entity has been in a state;
generating per-entity metrics and aggregate metrics, wherein the per-entity metrics and aggregate metrics include network metrics, at a metrics calculator for the customer service application based at least in part on the state transition measurements for entities in a non-anomalous state, wherein anomalous per-entity metrics are filtered out before calculating the aggregate metrics;
adjusting in a performance optimizer the operations of the customer service application in real time based on the per-entity metrics and the aggregate metrics, wherein adjusting the operations of the customer service application in real time based on the per-entity metrics and the aggregate metrics comprises:
determining based on the per-entity metrics and the aggregate metrics generated from customers' interactions with the customer service application that an external entity is attempting to infiltrate the computer system, and
in response to determining based on the per-entity metrics and the aggregate metrics that the external entity is attempting to infiltrate the computer system, the performance optimizer automatically and proactively blocking the infiltration attempt by the external entity against the computer system; and
displaying information related to the per-entity metrics and the aggregate metrics and the index of entities in an anomalous state in a user interface dashboard.

11. The non-transitory computer-readable medium of claim 10, wherein, in addition to tracking state-machine states of entities, the system tracks one or more counts associated with the entity, and wherein one or more per-entity and/or aggregate metrics are generated based on the counts associated with entities.

12. The non-transitory computer-readable medium of claim 10, wherein tracking states of the entities comprises:
for each event received, performing the following in real time:
identifying a pre-event state associated with an entity to which the event pertains, wherein, in response to the entity being new, the pre-event state is a starting state based on state machine logic for the customer service application;
determining whether the event is a valid event for the entity given the pre-event state and the state machine logic for the customer service application;
in response to determining not a valid event for the entity, recording an anomalous state for the entity; and in response to determining a valid event, identifying a current state for the entity based on the event, the pre-event state, and the state machine logic for the customer service application.

13. A computer system for adjusting operations of a customer service application based on metrics generated as a result of real-time monitoring of entity states within the customer service application, the system comprising:
one or more processors;
one or more memory units coupled to the one or more processors, wherein the one or more memory units store instructions that, when executed by the one or more processors, cause the system to perform the operations of:
receiving at a bus entity events from a plurality of services provided by the customer service application;
tracking states of entities in real time in a state machine for the customer service application based on the events received from the bus and the state machine logic for the customer service application, wherein tracking states of entities includes 1) identifying any entities in an anomalous state and 2) for each state entered by an entity, tracking a time in which the entity enters a state;
sending information on any entities identified by the state machine as being in an anomalous state back to the bus, wherein the bus transports the information to an indexer, and wherein the indexer creates an index of entities in an anomalous state;
for each non-anomalous state transition, calculating one or more state transition measurements, including how long an entity has been in a state;
generating per-entity metrics and aggregate metrics, wherein the per-entity metrics and aggregate metrics include network metrics, at a metrics calculator for the customer service application based at least in part on the state transition measurements for entities in a non-anomalous state, wherein anomalous per-entity metrics are filtered out before calculating the aggregate metrics;
adjusting in a performance optimizer the operations of the customer service application in real time based on the per-entity metrics and the aggregate metrics, wherein adjusting the operations of the customer service application in real time based on the per-entity metrics and the aggregate metrics comprises:
determining based on the per-entity metrics and the aggregate metrics generated from customers' interactions with the customer service application that an external entity is attempting to infiltrate the computer system, and
in response to determining based on the per-entity metrics and the aggregate metrics that the external entity is attempting to infiltrate the computer system, the performance optimizer automatically and proactively blocking the infiltration attempt by the external entity against the computer system; and
displaying information related to the per-entity metrics and the aggregate metrics and the index of entities in an anomalous state in a user interface dashboard.

14. The computer system of claim 13, wherein, in addition to tracking state-machine states of entities, the system tracks one or more counts associated with the entity, and wherein one or more per-entity and/or aggregate metrics are generated based on the counts associated with entities.

15. The computer system of claim 13, wherein tracking states of the entities comprises:
for each event received, performing the following in real time:
identifying a pre-event state associated with an entity to which the event pertains, wherein, in response to the entity being new, the pre-event state is a starting state based on state machine logic for the customer service application;
determining whether the event is a valid event for the entity given the pre-event state and the state machine logic for the customer service application;
in response to determining not a valid event for the entity, recording an anomalous state for the entity; and
in response to determining a valid event, identifying a current state for the entity based on the event, the pre-event state, and the state machine logic for the customer service application.

\* \* \* \* \*